United States Patent [19] [11] Patent Number: 5,008,009
Ciaffoni [45] Date of Patent: Apr. 16, 1991

[54] MECHANISM FOR FILTER CAKE REMOVAL

[75] Inventor: James L. Ciaffoni, Nevada City, Calif.

[73] Assignee: Baker Hughes Incorporated, Houston, Tex.

[21] Appl. No.: 380,841

[22] Filed: Jul. 17, 1989

[51] Int. Cl.⁵ .............................................. B01D 35/20
[52] U.S. Cl. .................................... 210/193; 55/300; 210/232; 210/388; 210/413; 210/441
[58] Field of Search ................. 55/112, 300; 210/193, 210/323.2, 346, 332, 333.01, 388, 407, 413, 384, 389, 232, 437, 441, 497.01; 209/273, 365.3

[56] References Cited

U.S. PATENT DOCUMENTS

| 2,192,668 | 3/1940 | Strain | 209/365.3 |
| 3,100,190 | 8/1963 | Hobson | 210/332 |
| 3,212,643 | 10/1965 | Schmidt et al. | 210/346 |
| 4,265,771 | 5/1981 | Lennartz et al. | 210/323.2 |
| 4,279,749 | 7/1981 | Moore | 210/332 |
| 4,289,630 | 9/1981 | Schmidt et al. | 210/332 |
| 4,501,539 | 2/1985 | Fenton et al. | 210/413 |
| 4,526,688 | 7/1985 | Schmidt et al. | 210/332 |
| 4,741,841 | 5/1988 | Boare et al. | 210/332 |
| 4,804,481 | 2/1989 | Lennartz | 210/388 |
| 4,836,922 | 6/1989 | Rishel et al. | 210/388 |

FOREIGN PATENT DOCUMENTS

| 1340797 | 9/1987 | U.S.S.R. | 210/413 |
| 2080152 | 2/1982 | United Kingdom | 55/112 |
| 88/06056 | 8/1988 | World Int. Prop. O. | 210/413 |

Primary Examiner—Richard V. Fisher
Assistant Examiner—Joseph Drodge
Attorney, Agent, or Firm—Skjerven, Morrill, MacPherson, Franklin & Friel

[57] ABSTRACT

Filter cake is shaken off a candle or other similar filter by impact action. Sullied solution is passed in cross flow through a vertical disposed tube of a filter element, such as a tubular screen, positioned in a lower filter chamber and into a central axial exit tube which extends through an apertured horizontal partition forming the bottom of an upper filter chamber. An outlet housing surrounds and is fixed with respect to the exit tube in the upper chamber. One or more belleville or coil springs are positioned between the outlet housing and the partition. An impact force is applied against the top of the outlet housing to drive the outlet housing, exit tube, and candle filter so that the assembly impacts downwardly against and compresses the belleville or coil springs. The stored energy returns the housing, tube and filter upward to a reimpaction position. The abrupt change in momentum upon original impact of the housing and the bottoming of the housing against the then compressed spring shakes off the filter cake deposited on the filter element either directly or with a filter aid initially coated on the exterior of the filter element.

12 Claims, 4 Drawing Sheets

5,008,009

MECHANISM FOR FILTER CAKE REMOVAL

FIELD OF THE INVENTION

This invention is directed to a mechanism for mechanically discharging a filter cake formed on a filter element. More particularly, the invention comprises an impact rapping mechanism for a so-called candle filter having one or more filter elements hanging vertically in a filter chamber.

BACKGROUND OF THE INVENTION

Conventional filtering systems for filtration of solids and oils generally use one or both of two common methods to remove the layer of accumulated particles from the outside surface of the filter element at the end of the filtration cycle. One of these methods involves a high pressure pulse of compressed air introduced after cake drying on the downstream side of the filter and caused to flow in a direction opposite to the filtrate flow direction. A second method utilizes abrupt changes in the speed and direction of the filter element and attached cake by multiple rapping or vibration in hope of overcoming the adhesive forces through a change in cake momentum over a very short time interval.

The standards of the industry thus far examined have attempted to evoke this second method by moving the entire supporting structure of the filter element, the supporting structure usually having a mass very large in comparison to that of the filter element. The downfall of this approach seems to be that the large mass limits the acceleration of the support structure, and the material strain when attempting to halt the motion of such a large mass lengthens the time interval over which the final velocity change takes place, resulting in lower forces being produced in the adhesive layer and insufficient cake removal. Other obvious disadvantages of this approach are noise pollution and the wear and associated replacement costs of very large parts.

Tests were conducted on a candle filter comprising a filter screen usually coated with a filter aid or media and utilizing an air blow method of filter cake discharge. The filter cake, consisting typically of an initially deposited layer of diatomaceous earth and a subsequent, thin, outer layer of clay, was subjected to final differential pressures ranging from 16 to 40 p.s.i. for a time period ranging from 15 minutes to 45 minutes during the filtration cycle. A pulse of air with a flow rate of 400 cfm @ 100 p.s.i. was then directed through the cake in the reverse flow direction. In no cases was the cake totally removed and the non-repeatability of test results was apparent. It was believed that random distribution and orientation of high pressure induced cracks in the cake produced inconsistent and undesirable results. Tests were also conducted on a prior art mechanical rapping device and these were found to be unsuccessful after multiple raps, e.g. as many as 45 raps, for the conditions tested.

Heretofor, others have developed various rapping devices for discharging filter cake from a filter. These are, in part, exemplified by U.S. Pat. No. 3,100,190 in which a candle mechanism connected to a spring shakes a series of vertical filter tubes connected to a common partition up and down against a fixed flange extending inwardly from a filter tank wall; 3,482,700 in which a movable horizontal partition is bounced up and down by an actuator with springs in the filter chamber; 4,265,771 in which a rapper moves a partition carrying a series of tubes and where the partition sealingly abuts and is movable relative to the filter casing; and 4,526,688 and 4,289,630 where a vibratory impactor imparts vertically directed shock waves to a rigid manifold from which filter tubes fixedly depend. In 4,741,841 a vibrator continuously vibrates a series of tubes mounted on a flexible diaphragm and in 4,517,086 a rapper has a vertical plunger which shakes a partition.

SUMMARY OF THE INVENTION

The phenomena of cake removal must, in the most general sense, involve the pattern of motion of the filter element. This pattern could involve vibration at one or several frequencies as well as net displacement of the filter element and transient effects. The parameters controlling these constituents of the motion pattern are the natural frequency of the spring-mass system and the nature and frequency of the driving force. Through the use of springs of different thicknesses and nonlinear springs the system's natural frequency can be controlled. The driving force can be applied with any electric, pneumatic, or hydraulic device or other means.

The present invention incorporates, as its source of the driving force, a vertically operable pneumatic cylinder which has a steel weight attached to the downward acting cylinder rod whose lower surface intermittently impacts a housing in an upper filter chamber which carries one or more filter elements or tubes depending therefrom, the tubes being positioned in a lower filter chamber. Each impact drives the housing and the filter elements downward to their limit of travel. The term "filter tubes" are sometimes referred to as "candles" herein since these terms are used interchangedly in the filter industry. A relatively large change of the momentum of the candles initially occurs upon impact and movement from the rest position and when the housing has reached its limit of travel, a second large change of momentum occurs when the housing is brought rapidly to rest. In order to maximize magnitudes of these initial and final momentum changes, associated springs are arranged to minimize the resistance to acceleration and to maximize the travel of the candle depending from the housing.

A fixed apertured horizontal partition separates the filter casing into upper and lower chambers with the housing being primarily in the upper chamber and the candle being in the lower chamber. As a part of the above-described rapping mechanism, a candle exit tube extends from the interior of the candle element, through a partition aperture and is fixed to the housing.

In one embodiment a series of annular belleville springs are positioned between the housing bottom and the fixed partition. These springs compress to allow bottoming out of the impacted housing and expand upon cessation of the impact force to return the housing to a position for reimpactation on the next filter discharge cycle.

In another embodiment, a pair or more of coil springs extend between a housing top flange and a top surface of an annular collar in the upper chamber and extending upwardly from the partition. In these and other embodiments, the housing with its attached top, an anvil surface thereon, side outlet, the filter candle(s) and a candle exit tube for each candle are all reciprocable as one piece in a bearing provided in the horizontal partition aperture(s) so as to provide for rapping of the candle to discharge filter cake therefrom.

With an air pressure of 7.03 kg/sq cm, and air cylinder cross sectional area of 21.08 sq. cm, a candle mechanism length of travel of 0.95 cm, a steel bar-to-candle mechanism air gap spacing of 1.90 cm, and a steel bar weight of 6.80 kg, very successful results were obtained. The steel bar is the weight that is attached to the vertically mounted cylinder. This weight is used to provide added acceleration in addition to that caused by cylinder pressure while also providing a durable surface for impacting the top surface of the filter cake discharge mechanism. Its height above the housing was adjusted to a minimum distance that would still ensure a sufficiently large final momentum to completely remove, i.e. about 98% of the filter cake.

DETAILED DESCRIPTION

Figure 1:
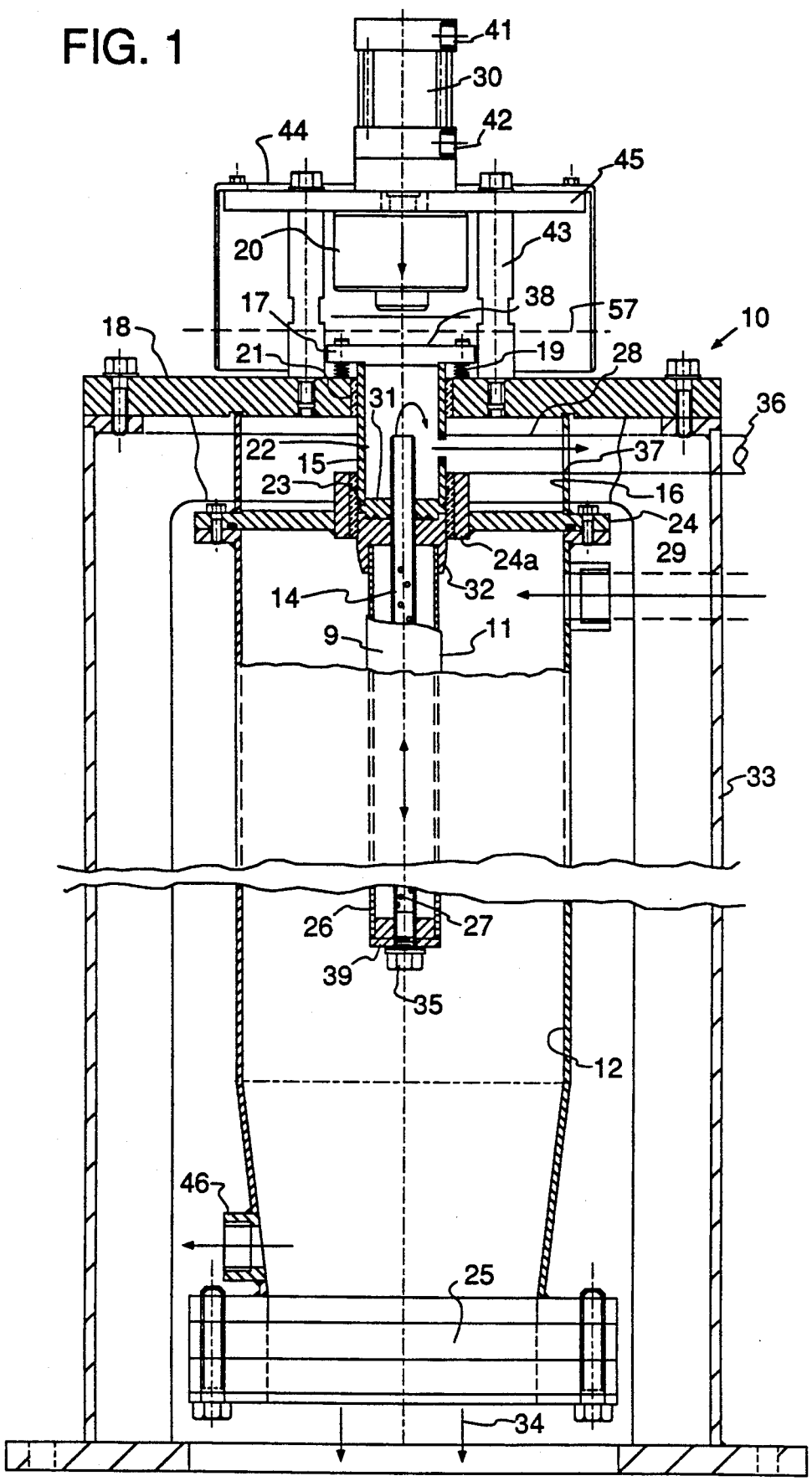
FIG. 1 is a partial cross-sectional side view of the rapping mechanism.

The rapping mechanism of the invention is seen in FIG. 1. A candle filter system 10 includes one or more candle filters 11 vertically supported in a lower filter chamber 12. A filter element such as a metal screen, sintered metal, or fabric tube 26 forms an outer cylindrical foraminous wall of the candle. A filter aid 9 is normally predeposited on the exterior peripheral surface of the screen length. A filtrate exit tube 14 extends axially through the candle filter 11 from a lower end thereof to an upper end extending into and in flow communication to a cylindrical housing 15 contained in part in an upper filter chamber 16. The candle element 26 (sometimes called a "screen" herein) is affixed at its top to a bronze or stainless steel upper end cap 32 having the same outer diameter as housing 15 and a housing bottom 31 such that the housing, the housing bottom, cap, and exit tube 14 are affixed together forming with a housing top 17 a sub-assembly. The sub-assembly is reciprocable vertically in a cylindrical sleeve bearing 23 contained in a collar 24a affixed in an aperture in a fixed horizontal partition 24. The partition separates and seals lower filter chamber 12 from upper filter chamber 16. The lower end of the candle screen 26 is held in a lower end cap 39 by a nut 35 affixed to a threaded lower end of exit tube 14. Exit tube 14 includes a series of apertures 27 which permit flow of clean filtrate resultant from the filtering by the filter and on the screen 26 of a sullied (dirty) solution or slurry entering the lower filter chamber 12 through inlet 29 as shown by the arrow. The solution/slurry is pressurized so that a filtrate thereof passes through the filter aid and filter element or screen, depositing a contaminant filter cake on the exterior peripheral cylindrical surfaces of the filter aid on the candle screen. The filtrate then passes through the screen into exit tube 14 by passing through apertures 27 and exits the top of tube 14 into housing 15 and through a housing outlet tube 28 into a surrounding annulus of upper filter chamber 16. A filtrate outlet slot 37 is provided in a side wall of chamber 16 through which housing outlet tube 28 passes and is then attached to a filtrate flexible outlet tube 36, for filtrate removal from the filter system.

Housing 15 includes a flanged top 17 which extends above a filter system support top wall 18 which is fixed by suitable bolts to a preferably cylindrical vertical support wall 33. A series of coil springs 19 extend between an outer peripheral underside of the flanged housing top 17 and spaced positions around an annulus surrounding an aperture in a support top 18. A cylindrical sleeve bushing 21 is mounted in the support top aperture with housing 15 reciprocable therein. An impactor 20 driven by conventional mechanical, pneumatic, electrical, or hydraulic piston means 30 is movable downwardly at high acceleration i.e. about 6000 cm/sec/sec, so as to rap an axial anvil surface 38 on the upper surface of housing top 17. Hydraulic fluid inlets 41,42 provide hydraulic fluid or air for piston movement up and down.

When the impactor is actuated by a control (not shown), which normally is triggered by a timing signal or pressure signal indicative of backpressure caused by a predetermined thickness of cake deposited on the filter element, it impacts the housing top anvil surface 38 driving the housing, the exit tube, the filter media end caps and the candle itself, i.e. the screen and any supporting structure, rapidly downward, compressing springs 19 and discharging cake and filter aid from the screen resultant from the initial momentum change imparted and the momentum change when the housing flange bottoms out on the then fully compressed springs 19. The then stored energy in the springs returns the housing to the rest position as the impactor moves upwardly to its neutral non-impact position. Normally, not more than five raps are necessary to remove about 98% of filter cake from the candle element. The impactor 20 and its driving means 30 are supported by a frame 44 comprising a cross-piece 45 and spaced posts 43 extending from support top 18. Cake discharged from the candle(s) drops by gravity through a butterfly or other discharge valve 25 for removal as indicated by arrows 34. Outlet 46 is provided to drain the slurry entering chamber 12 prior to a rap cycle so that relatively dry filter cake can drop from the candle(s) and through a then-open butterfly valve 25 for recovery or disposal. Unlike known prior art devices, it is thus seen that energy from the impactor is transmitted directly to the candle element. The small mass is concentrated directly above the candle filter itself and has a maximum diameter (housing top 17) generally not more than twice the diameter of the candle. The housing 15 and the end cap 32 have a diameter of less than about 150% of the candle diameter and are the only structural parts which move vertically with the candle and its exit tube and bottom end cap. In the embodiments shown, this lightweight structure is all within an axial column of 2D formed by the housing and the depending candle where D represents the diameter of the candle. Thus, in employing the same impact energy, there is less energy loss in the system resulting in more momentum changes in the candle. Normally, only 3–5 raps are needed to remove 98% of the filter cake rather than the 30–45 raps or more needed in a tested prior art device.

Figure 2:
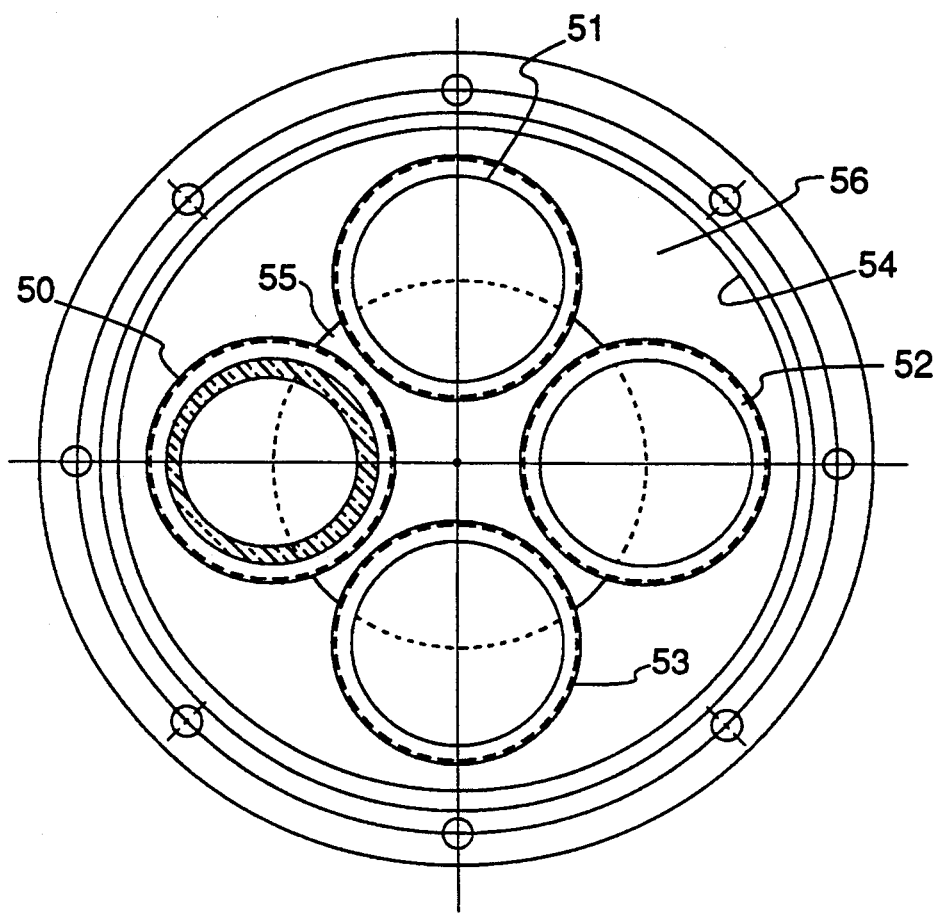
FIG. 2 is a partial cross-sectional top view of a lower filter chamber showing an embodiment employing multiple vertical candles.

FIG. 2 illustrates a multi-candle embodiment where two or more, four being shown, cylindrical candles 50, 51, 52 and 53 depend from a corresponding number of housings (not shown) reciprocably extending through a fixed horizontal partition with a corresponding number of apertures, which separates the filter into upper and lower chambers. In FIG. 2 only a lower chamber 54 is shown. Filter cake is deposited on the filter element of each candle. When the candles are rapped as described with respect to FIG. 1, the discharged cake drops downward either directly into discharge valve 55 or along a tapered sidewall surface 56 of the lower chamber. Exit tubes from each candle extend into housings such as seen in FIG. 1 which can be individually rapped by four actuators. Alternatively the multiple housings can be simultaneously rapped by providing a single horizontal large-diameter flat strike plate (not shown) which bridges across anvil surfaces on all the housings extending above a filter support top wall, typically in the position shown by the dash line 57 in FIG. 1.

Figure 3:
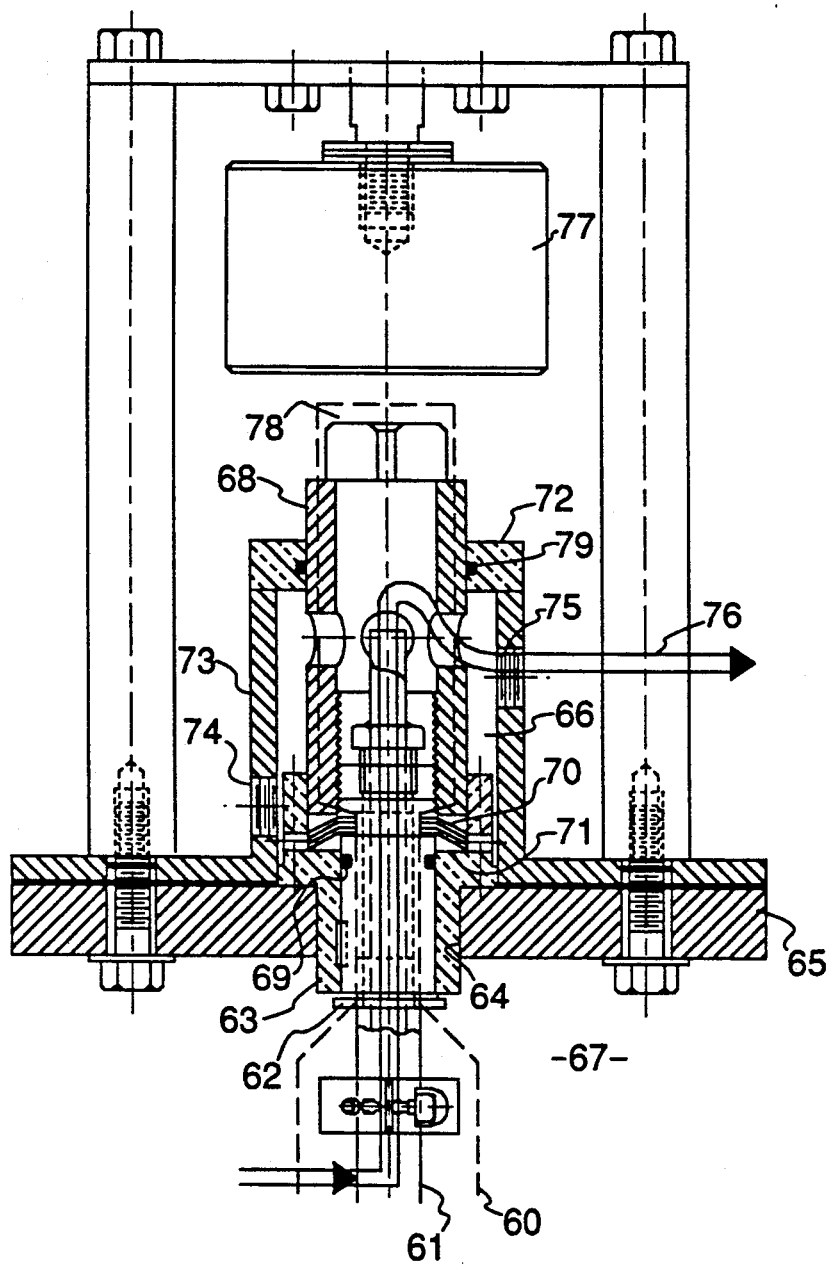
FIG. 3 is a partial cross-sectional side view of a third embodiment of the rapping mechanism.

FIG. 3 shows another embodiment of the invention in which a candle 60 and attached exit tube 61 is affixed to a flanged collar 62 which is vertically reciprocable in a collar 63. Collar 63 is affixed in an aperture 64 in a horizontal partition wall 65 separating the filter into upper chamber 66 and lower chamber 67. Housing 68 is positioned in upper chamber 66 and is reciprocably movable with respect to collar 63. One or more annular belleville springs 70 surrounding exit tube 61 are positioned between the bottom annular end of housing 68 and an annular area 71 on the top of fixed collar 63. Collar 63 is sealed by O-ring 69 in collar 62 and housing 68 sealed by O-ring 79 positioned in an aperture in the top wall 72 of the upper chamber 66. Sidewall 73 of the upper chamber 66 is apertured at 74 to allow connection of the high pressure air source for optional air blow cake removal and at 75 to allow connection of a flexible outlet tube (not shown) for filtrate removal from the upper annular portion of upper chamber 66 as indicated by arrow 76.

In cake discharge operational mode impactor 77 strikes the top edge of an anvil plug 78 forming a closed top of housing 68, driving the housing down to compress the belleville springs while at the same time providing a prescribed momentum change to exit tub 61 threadedly connected to the housing, collar 62 and the candle 60 so as to dislodge filter cake from the candle media. Upon cessation of the rapping force by the impactor the belleville springs will decompress returning the housing 68, collar 62, exit tube 61 and candle as a unit to their pre-rapped position.

Figure 4:
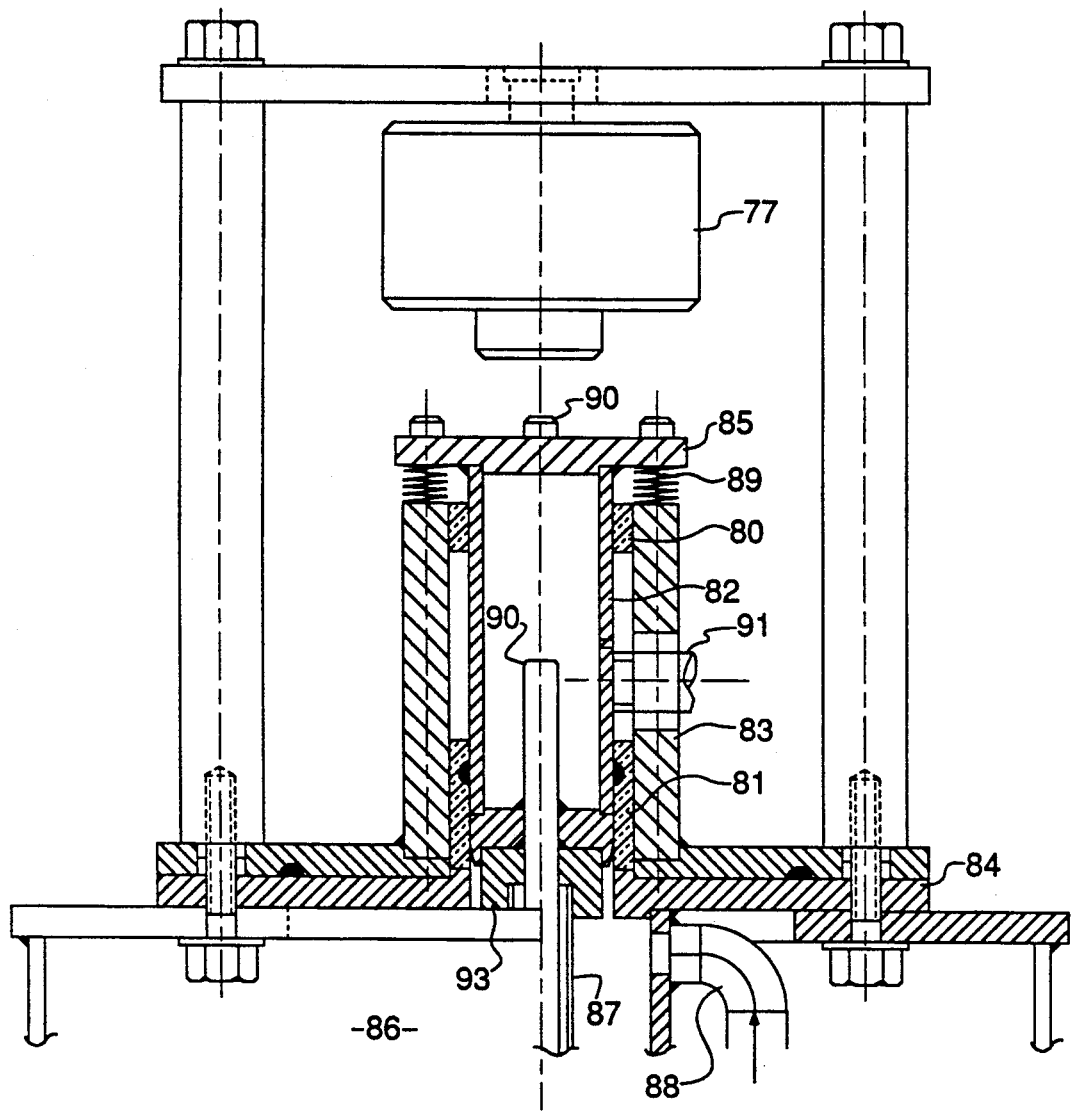
FIG. 4 is a partial cross-sectional side view of a fourth embodiment of the rapping mechanism.

FIG. 4 illustrates a further embodiment of the invention wherein an upper bearing ring 80 and lower bearing ring 81 are provided between an inner cylindrical housing 82 and a support upper tank portion 83, the latter welded to a partition 84 sealing a lower chamber 86 of the tank. As in FIG. 1 coil springs 89 are positioned between an underside of housing top wall 85 and the top end of upper tank portion 83. The candle 87 is positioned in lower chamber 86 which is fed with the stream to be filtered. Filter cake is deposited on the candle and filtrate is removed through vertical axial tube 90 and exit tubing 91. Rapping by impactation of the impactor 77 on anvil(s) 90 on the housing top 85 drives the housing, the exit tube 91, collar 92 and the upper end cup 93 holding the top of candle 87 downward sliding against bearing rings 80, 81 to dislodge filter cake from the candle media. Tube 88 is provided to supply air to air - dry cake deposited on the filter candle media prior to cake discharge.

The above description of embodiments of this invention is intended to be illustrative and not limiting. Other embodiments of this invention will be obvious to those skilled in the art in view of the above disclosure.

I claim:

1. A mechanism for discharging filter cake from a cross flow filter element wherein sullied solution traverses through said element and deposits a filter cake on said element and clean filtrate passes through and exits from said element, said mechanism comprising:
   a fixed non-flexible closure partition extending across a chamber forming an upper chamber and lower closed filter chamber, said partition having at least one aperture extending therethrough, said filter element being contained in said lower filter chamber;
   an inlet pipe conveying sullied solution and attached to said lower filter chamber;
   means for mounting said filter element in said lower chamber, said means including at least one filtrate exit tube movably positioned through said at least one partition aperture and in flow communication with a filter element interior portion;
   an outlet housing in said upper chamber surrounding and rigidly attached to said exit tube;
   spring means interposed between an annular portion of said housing and an annular member which is fixed with respect to said partition; and
   rapping means mounted independently of said outlet housing extending from a position above said outlet housing constructed and arranged to contact and drive said outlet housing downward by impact, forcedly compressing said spring means, whereby said outlet housing is caused to bottom against said spring means such that filter cake deposited on an exterior surface of said filter element in said lower chamber is shaken therefrom, and wherein said spring means, upon removal of said compressing force, is designed to release its resultant stored energy to return said housing and said filter element to a pre-rapped position spaced from said rapping means.

2. The rapping mechanism of claim 1 in which said spring means comprises at least one annular belleville spring.

3. The rapping mechanism of claim 1 in which said partition includes an annular collar extending from said partition into said upper chamber, said housing including a housing top having a top flange extending therefrom and wherein said spring means extends between an underside of said top flange and a peripheral top surface of said annular collar.

4. The rapping mechanism of claim 1 in which said element comprises an elongated vertical annular filter tube descending from said outlet housing and contained in said lower filter chamber, said filter tube comprising an elongated cylindrical screen.

5. The rapping mechanism of claim 4 in which said filter tube is a candle filter and said screen includes a filter aid coated on an exterior peripheral surface thereof.

6. The rapping mechanism of claim 4 in which said filter is a tubular crossflow filter.

7. The rapping mechanism of claim 4 in which said outlet housing annularly surrounds an upper portion of said exit tube in said upper chamber; and further including an outlet port in said housing in flow communication between an opening in said exit tube and an exit port in said upper chamber for removing clean filtrate from said upper chamber.

8. The rapping mechanism of claim 7 wherein said housing includes an upwardly-facing anvil and wherein said rapping means intermittently impacts said anvil to shake said filter cake from an exterior surface of said vertical annular filter.

9. The rapping mechanism of claim 1 wherein said partition includes an annular collar fixedly extending upwardly therefrom and in which said housing moves vertically in relation to said annular collar in response to said rapping means and said spring means.

10. The rapping mechanism of claim 9 in which said annular collar includes a top closure having an opening therein, an upper part of said housing being sealingly movable in said opening and a lower part of said housing being movable in said at least one partition aperture and wherein said annular collar, said partition and said top closure define said upper chamber.

11. The rapping mechanism of claim 10 in which said housing has a flanged top and wherein said spring means extends between an underside of said flanged top and an upper surface of said collar top closure.

12. The rapping mechanism of claim 1 further including a bushing surrounding a top section of said housing and a bearing spaced from said bushing and surrounding a bottom section of said housing adjacent said partition whereby said housing and attached filter element are guided vertically by said spaced bushing and bearing.

* * * * *